Patented Feb. 19, 1946

2,395,017

UNITED STATES PATENT OFFICE 2,395,017

RUBBERLIKE MULTIPOLYMERS

Waldo L. Semon, Silver Lake, Ohio, assignor to The B. F. Goodrich Company, New York, N. Y., a corporation of New York No Drawing. Application December 26, 1942, Serial No. 470,227

6 Claims. (Cl. 260—84.5)

This application is a continuation-in-part of my copending application Serial No. 322,383, filed March 5, 1940, and relates to new synthetic rubbers and a method of preparing the same.

For many years prior to this invention workers in the art have sought to produce a synthetic rubber which would resemble natural rubber in possessing excellent plasticity, tackiness and ease of processing when unvulcanized and in being capable of vulcanization to a strong elastic condition, and at the same time would excel natural rubber in those properties, such as resistance to oil, to heat, and to oxidation, in which natural rubber is deficient. Such a synthetic rubber would obviously be able to serve not only as a general replacement for natural rubber but also in new applications in fields where natural rubber cannot be used.

The synthetic rubbers which have been described prior to this invention, however, have been found to be lacking in one or more of these desired characteristics. Thus, for example, the synthetic rubber produced by copolymerizing butadiene and acrylonitrile is much more resistant to oils than is natural rubber but, on the other hand, is much less plastic and tacky and can be processed only with difficulty. Similarly, other proposed synthetic rubbers although possessing some of the desired properties are deficient in others.

I have now discovered a new class of synthetic rubbers, and a method of preparing the same, which synthetic rubbers possess to a remarkable degree a proper balance between all of the properties desired. Thus, the synthetic rubbers of this invention are not only plastic, easily worked and easily processed in the unvulcanized state but also are exceptionally strong, resilient and resistant in the vulcanized state. Furthermore they possess other valuable properties which make them especially useful in a number of specialized applications.

The new synthetic rubbers of this invention are polymeric materials, termed herein multipolymers because they are derived from at least three polymerizable constituents, and are prepared by the polymerization of a mixture of at least three polymerizable materials at least one of which is a butadiene-1,3 hydrocarbon and at least two of which are polymerizable acrylic compounds, the butadiene-1,3 hydrocarbon component being present in the mixture to an extent of at least 50% by weight.

The term "butadiene-1,3 hydrocarbon" is used herein to include not only butadiene-1,3 itself (commonly called butadiene) but also its hydrocarbon homologues which polymerize in essentially the same manner such as isoprene, 2,3-dimethyl butadiene-1,3, piperylene, hexadiene-1,3 and the like. All these materials generally possess the structure

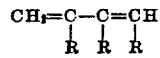

wherein R is hydrogen or an alkyl group.

The term "polymerizable acrylic compound" is used herein in its ordinary generic sense to include not only acrylic acid and its homologues and simple substitution products which polymerize in essentially the same manner such as methacrylic acid, ethacrylic acid, alpha-chloro acrylic acid and the like but also the polymerizable derivatives of such acids such as the esters, nitriles and amides of such acids. All such compounds are commonly named with reference to the parent compound, acrylic acid, all polymerize in essentially the same manner, i. e., by 1,2 addition, and all contain a

group connected by a single valence to a carbon atom having at least two of its remaining three valences connected to the same atom and having each of its remaining three valences connected to an atom of an element having an atomic number greater than 6 and less than 9 (i. e., nitrogen and oxygen).

As mentioned hereinabove, in the production of the rubber-like multipolymers of this invention it is necessary that the mixture to be polymerized contain at least 50% by weight of a butadiene-1,3 hydrocarbon. Otherwise the proportions of the various polymerizable materials may be varied over the entire range provided of course that each of the polymerizable acrylic compounds is present in a proportion sufficient to affect the properties of the multipolymer, this being done usually by as little as 5% by weight. For most purposes mixtures containing from 50 to 80% by weight of a butadiene-1,3 hydrocarbon and from 10 to 40% by weight of each of at least two polymerizable acrylic compounds, are preferred.

The specific properties of the multipolymers of this invention will vary with the nature and proportions of the polymerizable acrylic compounds employed in each particular case but, in general, all such multipolymers are more plastic, more soluble and more easily processed when in the unvulcanized condition and are more resilient and elastic in the vulcanized condition than are similarly prepared two-component copolymers prepared from mixtures containing an equal proportion of the butadiene-1,3 hydrocarbon and an equal proportion of only one instead of two acrylic compounds. Moreover, it often happens that such multipolymers are prepared in greater yield and in a shorter time under the same conditions than are the two-component copolymers.

For example, the multipolymers prepared by the polymerization of a mixture of at least 50% by weight of a butadiene-1,3 hydrocarbon and, at least 10% by weight of at least two acrylic nitriles, i. e., nitriles containing the structure

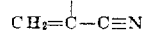

such as acrylonitrile, methacrylonitrile, ethacrylonitrile, alpha-butyl acrylonitrile, alpha-phenyl acrylonitrile, alpha-chloro acrylonitrile, alpha-methoxymethyl acrylonitrile and the like, are plastic, soluble and easily worked in the unvulcanized state even though the copolymers of a butadiene-1,3 hydrocarbon with only one such nitrile are lacking in plasticity and solubility and are ordinarily quite difficult to process. Furthermore, these multipolymers of a butadiene-1,3 hydrocarbon and at least two acrylic nitriles retain the excellent oil-resistance of the two-component copolymers and additionally yield vulcanizates which are superior in tensile strength and ultimate elongation. Accordingly, they are quite useful for applications requiring an oil-resistant rubbery product as well as in the ordinary uses for natural rubber. Multipolymers prepared from a butadiene-1,3 hydrocarbon and two acrylic nitriles are also disclosed and claimed in my copending application Serial No. 322,383 filed March 5, 1940, of which this application is a continuation-in-part.

As another example, the multipolymers prepared by the polymerization of a mixture of at least 50% by weight of a butadiene-1,3 hydrocarbon, at least 10% by weight of an acrylic nitrile and at least 10% by weight of an acrylic acid, i. e., an acid containing the structure

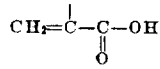

such as acrylic acid itself, methacrylic acid, ethacrylic acid, alpha-chloro acrylic acid or the like, are obtained in good yield in a relatively short time, possess good working properties and may be vulcanized to obtain strong resilient vulcanizates. Moreover, the vulcanizates of these multipolymers possess the additional valuable property of being resistant to permeability of aromatic as well as aliphatic hydrocarbons and accordingly are particularly useful as linings for tanks adapted to contain hydrocarbon fuels containing both aromatic and aliphatic hydrocarbon constituents as well as in other applications. Neither the simple copolymers of butadiene-1,3 hydrocarbons and acrylic nitriles nor the simple copolymers of butadiene-1,3 hydrocarbons and acrylic acids possess this combination of valuable properties. Properties similar to those of the butadiene-1,3 hydrocarbon, acrylic nitrile, acrylic acid multipolymers are possessed by the corresponding multipolymers in which an acrylic amide, i. e., a compound containing the structure

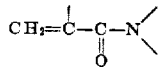

such as acrylamide, methacrylamide, alpha-chloro acrylamide, N-methylacrylamide, N-phenyl - alpha - methacrylamide, N,N - diethyl acrylamide and the like, is substituted for the acrylic acid.

As still another example of a preferred subclass of multipolymers within the class of synthetic rubbers of this invention there may be mentioned the multipolymers prepared from a mixture containing at least 50% by weight of a butadiene-1,3 hydrocarbon and at least 10% by weight of each of at least two esters of acrylic acid containing the structure

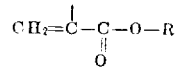

wherein R is the radical of a monohydric alcohol. Typical examples of such esters include methyl acrylate, ethyl acrylate, isopropyl acrylate, n-butyl acrylate, 2-ethyl hexyl acrylate, decyl acrylate, lauryl acrylate, cetyl acrylate, crotyl acrylate, allyl acrylate, furfuryl acrylate, benzyl acrylate, cyclohexyl acrylate, chloro-ethyl acrylate, methoxy-methyl acrylate and the like as well as the corresponding methacrylates, ethacrylates, chloro-acrylates, butacrylates, phenacrylates, furyl acrylates and the like. These multipolymers, derived from a mixture of a butadiene-1,3 hydrocarbon and two such esters, are generally quite superior to copolymers of a butadiene-1,3 hydrocarbon with only one such ester in regard to plasticity and solubility and especially in regard to the resiliency of the vulcanizates. Moreover the vulcanizates of these multipolymers generally possess a low hysteresis and a low permanent set combined with good tensile strength so that they are well adapted for use in the construction of tires, while the simple copolymers of a butadiene-1,3 hydrocarbon with only one such ester are not so well suited. Multipolymers from butadiene-1,3, an alkyl ester of unsubstituted acrylic acid and an alkyl ester of an alpha alkyl substituted acrylic ester possess especially useful properties. Multipolymers of this type are also disclosed and claimed in my copending application Serial No. 322,383, filed March 5, 1940, of which this application is a continuation-in-part.

Another particularly preferred class of multipolymers within this invention are the multipolymers obtained from a butadiene-1,3 hydrocarbon, an acrylic nitrile and an acrylic ester. These multipolymers are not only plastic, soluble and easily worked in the unvulcanized state and strong and resilient in the vulcanized state but also possess the valuable property of remaining elastic and flexible at very low temperatures. This class of multipolymers is more fully described in my copending applications Serial No. 322,383 filed March 5, 1940, of which this application is a continuation-in-part, and Serial No. 426,340 filed January 20, 1942, also a continuation-in-part of Serial No. 322,383.

Other types of multipolymers within the scope of this invention which are prepared from a butadiene-1,3 hydrocarbon, an acrylic ester and an acrylic acid or an acrylic amide are also easily worked synthetic rubbers yielding strong resilient vulcanizates. Multipolymers prepared from a butadiene-1,3 hydrocarbon and at least two acrylic acids or acrylic amides are also more valuable than the simple copolymers of a butadiene-1,3 hydrocarbon and a single acrylic acid or amide, but in general these multipolymers are not as valuable as are those from mixtures containing two acrylic compounds at least one of which is an acrylic nitrile or an acrylic ester.

It should also be mentioned that it is within the scope of this invention to include in the mixture polymerized, in addition to the butadiene-1,3 hydrocarbon and the two or more acrylic compounds, other polymerizable compounds which are copolymerizable with such mixtures such as styrene and similar aryl olefins, vinyl compounds, chloroprene, etc.

In the practice of this invention, the polymerization of these monomer mixtures to form synthetic rubber is preferably carried out in aqueous emulsion although other polymerization methods such as polymerization in homogeneous system by the action of heat, light, pressure or catalysts may also be employed. In the emulsion polymerization process the mixture of monomers is emulsified in water by the use of a suitable emulsifying agent to form an aqueous emulsion to which is added, preferably, one or more polymerization initiators to start the polymerization reaction, one or more polymerization accelerators to speed up the reaction and one or more polymerization modifiers to improve the quality of the product. The emulsion is then agitated at a temperature of about 20 to 80° C. for a time sufficient to complete the polymerization, about 10 to 100 hours usually being required. The polymerization product, which is obtained in the form of an aqueous dispersion resembling natural rubber latex is then stabilized by the addition of an age resister or antioxidant such as phenyl beta naphthylamine and is then coagulated by the same methods used to coagulate natural rubber latex, for example, by addition of acid, alcohol or salts or by a combination of these methods. Washing and drying of the coagulum produces a crude synthetic rubber which resembles crude natural rubber in appearance and in properties.

The preferred emulsifying agent for use in the above process consists of a water-soluble soap derived from a fatty acid containing between 10 and 20 carbon atoms, such soaps as the sodium or potassium salts of lauric, myristic, palmitic, oleic or stearic acids being quite suitable. It is usually desirable to employ the soap as an aqueous solution containing some free fatty acid, that is to emulsify the monomers with an aqueous solution containing a fatty acid which has been 70 to 95% neutralized with alkali, but it is also possible to employ solutions of soap which are completely neutralized or even solutions of soaps containing free alkali. Moreover, other emulsifying agents such as salts of organic bases containing long carbon chains, for example trimethyl cetyl ammonium sulfate, or alkali metal alkyl sulfates, for example, sodium lauryl sulfate, and aryl sulfonates, for example, sodium isobutyl naphthalene sulfonate, may also be employed.

Polymerization initiators which may be used in the emulsion polymerization process include the per-oxygen type compounds (sometimes called polymerization catalysts) such as hydrogen peroxide, benzoyl peroxide, ammonium persulfate, sodium perborate, potassium persulfate, potassium percarbonate and the like as well as other types of initiators such as diazoaminobenzene, dipotassium diazomethane disulfonate and triphenylmethyl azobenzene. The preferred polymerization accelerators, or catalysts, are heavy metal compounds which are added in small amounts to the emulsion either as simple ionizable heavy metal salts such as ferrous sulfate, cobalt chloride, nickel nitrate or the like, as disclosed in the copending application of William D. Stewart, Serial No. 379,712, filed February 14, 1941, or in form of a redox system comprising a heavy metal in complex combination or otherwise associated with some other material such as sodium pyrophosphate, levulinic acid, glycine, cystine, beta-mercaptoethanol, quebrachitol and cholesterol, as disclosed in the copending applications of William D. Stewart, Serial No. 379,713 to 379,717, filed February 14, 1941. Polymerization modifiers which are also preferably present during the polymerization are usually sulfur containing organic compounds such as the dialkyl dixanthogens, aliphatic mercaptans, the higher tetralkyl thiuram mono-, di-, and polysulfides, the 2-mercaptoalkyl thiazoles and the like.

Other polymerization initiators, catalysts, accelerators and modifiers as well as other substances variously known as polymerization regulators, promoters, etc., which enable the polymerization to be carried out in a shorter time and at a lower temperature and/or which in some manner improve the quality of the products obtained may also be included in the emulsion before polymerization. All of these added substances are mentioned only to indicate that best results are obtained when one or more of them are present, and it is not to be inferred that the monomer mixtures may not be polymerized in their absence.

The method of preparing the multipolymers of this invention and the properties which they possess may further be illustrated by the following specific examples in which the parts, unless otherwise indicated, are by weight.

*Example 1*

A mixture consisting of 70 parts butadiene-1,3, 15 parts acrylonitrile and 15 parts methacrylonitrile is emulsified with 250 parts of a 1½% aqueous soap solution and 15 parts of a 5% aqueous solution of potassium persulfate and allowed to polymerize with continuous agitation at 40° C. for 46 hours. Two parts of emulsified phenyl beta naphthylamine are added to the resulting latex-like emulsion and the emulsion is then coagulated by the addition of acetic acid and salt. Upon separating and drying, the coagulum is obtained as an elastic, tacky material which resembles crepe rubber. It can be milled without difficulty and becomes considerably more plastic than a copolymer obtained from butadiene and acrylonitrile alone. Compounding ingredients such as carbon black, stearic acid, sulfur and accelerator can be easily dispersed in the rubber-like product and compounds so prepared can be vulcanized to a soft elastic rubber having a tensile strength of 470 to 5000 lbs./sq. in. and an ultimate elongation of 580 to 600%. The vulcanizates so prepared are resistant to swelling by mineral and vegetable oils and are more resistant to heat and to aging than natural rubber vulcanizates.

*Example 2*

| | Parts |
|---|---|
| Butadiene-1,3 | 75 |
| Acrylonitrile | 15 |
| Methacrylonitrile | 10 | are emulsified in water with 250 parts of a 2% solution of palmitic acid which is 85% neutralized with alkali and in the presence of 10 parts of a 3½% hydrogen peroxide solution as polymerization initiator. The emulsion is maintained at 40° C. for 47 hours with continued stirring, and is then coagulated as in Example 1. The coagulum is separated, washed with warm water, and dried by milling on a rubber mill, whereby there is obtained 98 parts of a plastic, rubber-like product. When compounded as in Example 1, with carbon black, stearic acid, zinc oxide, sulfur and accelerator, a high grade soft rubber is obtained exhibiting a tensile strength of 5100 lbs./sq. in. and a 550% elongation. These values are to be compared with tensile strengths of from 4000 to 4500 lbs./sq. in. and elongations of 500 to 550% obtained from butadiene-acrylonitrile copolymers which have been similarly prepared, compounded and vulcanized. These results are quite remarkable when it is considered that this polymer is considerably more plastic and compares favorably in oil-resistance with the butadiene-acrylonitrile polymer.

*Example 3*

A mixture of polymerizable materials consisting of 55 parts of butadiene-1,3, 30 parts of methacrylonitrile and 15 parts of acrylonitrile is emulsified in 250 parts of a 2% aqueous solution of sodium myristate containing 0.35 part of hydrogen peroxide, 1.0 part of sodium ferri pyrophosphate and 0.6 part of diisopropyl dixanthogen, and is then polymerized for 24 hrs. at 30° C. At the end of this time a latex is obtained which yields upon coagulation 98 parts of a plastic tacky rubbery multipolymer. The multipolymer obtained is completely soluble in benzene and may be made into cements of high tack. Copolymers of butadiene-1,3 and a single nitrile prepared in the same way are only partially soluble in benzene and are difficult to use in cements.

*Example 4*

A mixture of 60 parts of butadiene-1,3, 30 parts of acrylonitrile and 10 parts of alpha-chloro acrylonitrile are polymerized as in Example 3. The polymerization is quite rapid, requiring only about 15 hours and yielded a plastic easily worked synthetic rubber which is exceptionally oil-resistant and yields excellent vulcanizates.

*Example 5*

A mixture of 55 parts of butadiene-1,3, 30 parts of acrylonitrile and 15 parts of acrylic acid are polymerized at 50° C. in an aqueous emulsion consisting of 250 parts of a 2% aqueous solution of Nacconal NRSF (a commercially available emulsifying agent of the alkyl benzene sulfonate type), 0.5 part of potassium persulfate, 0.4 part of diisopropyl dixanthogen and 0.3 part of a heavy metal polymerization catalyst comprising complex salts of iron and cobalt. After 20 hours the latex obtained is coagulated to yield 83 parts of a tough, coherent rubbery multipolymer which may be worked on roll mills, compounded and vulcanized to yield strong, resilient vulcanizates. The vulcanizates so obtained are only about half as permeable to motor fuels containing both aromatic and aliphatic hydrocarbons as are the vulcanizates of copolymers of butadiene-1,3 and acrylonitrile. Furthermore, these multipolymers are prepared in much higher yields, are more plastic and yield stronger more resilient vulcanizates than butadiene-1,3 acrylic acid copolymers.

*Example 6*

Example 5 is repeated except that methacrylamide is employed in place of acrylic acid. An 89% yield of a tough yet easily worked rubbery multipolymer is obtained. This multipolymer is also exceptionally resistant to permeability of motor fuels and yields when vulcanized strong resistant vulcanizates.

*Example 7*

|  | Parts |
| --- | --- |
| Butadiene-1,3 | 75 |
| Acrylonitrile | 15 |
| Ethacrylic acid | 10 | are emulsified in 200 parts of a 2% solution of sodium lauryl sulfate and in the presence of small amounts of potassium persulfate, diisopropyl dixanthogen and sodium ferri pyrophosphate. An 84% yield of a rubbery multipolymer is obtained after agitating the emulsion at 30° C. for 93 hours and then coagulating the latex. The multipolymer may be worked on rollers and is especially suitable for use as a lining for gasoline tanks because of its resistance to swelling in and diffusion of aliphatic and aromatic hydrocarbons.

*Example 8*

A mixture of 70 parts of butadiene-1,3, 20 parts of methyl acrylate and 10 parts of methyl methacrylate is polymerized as in Example 3. A plastic, soluble rubbery multipolymer is obtained which when compounded in a typical tire tread recipe yields a vulcanizate possessing high tensile strength and ultimate elongation and excellent resistance to heat and to abrasion. It also possesses hysteresis characteristics and a permanent set comparable to that of natural rubber so that it is of especial value for use in the manufacture of pneumatic tires.

*Example 9*

|  | Parts |
| --- | --- |
| Butadiene-1,3 | 70 |
| Butyl acrylate | 15 |
| Butyl methacrylate | 15 | are polymerized as in Example 3. A plastic, soluble synthetic rubber which may be vulcanized to yield vulcanizates having an exceptionally high elongation is obtained. Other polymers of still higher elongation are obtained by further increasing the chain length of the alkyl groups in the acrylic esters.

*Example 10*

|  | Parts |
| --- | --- |
| Butadiene-1,3 | 50 |
| Acrylonitrile | 20 |
| Methyl methacrylate | 30 | are polymerized in aqueous emulsion in the presence of soap and potassium persulfate as in Example 1. After 64 hours an elastic, tacky, rubber-like multipolymer is separated from the emulsion in the usual manner. This multipolymer is thermoplastic and is readily worked on a hot rubber mill, differing in this respect from the butadiene-acrylonitrile dual-polymers. Compounds containing this synthetic rubber are also easily extruded and molded and yield, when vulcanized, exceptionally resilient compositions having good resistance to solvents and to oxidation as well as possessing excellent tensile strength and ultimate elongation.

*Example 11*

|  | Parts |
| --- | --- |
| Butadiene-1,3 | 67 |
| Acrylonitrile | 13 |
| Methyl methacrylate | 20 | are polymerized as in Example 1, yielding a soft plastic rubber-like polymer, which when compounded and vulcanized as in Example 2 gives a tensile strength of 4000 lbs./sq. in. and a 420% elongation.

*Example 12*

| | Parts |
|---|---|
| Butadiene-1,3 | 70 |
| Methyl methacrylate | 10 |
| Acrylonitrile | 10 |
| Methacrylonitrile | 10 | are polymerized as in Example 2. A synthetic rubber-like product is again obtained which has excellent plasticity in the unvulcanized condition and which when vulcanized exhibits resistance to oils and to oxidation and possesses high tensile strength and ultimate elongation.

*Example 13*

A monomeric mixture consisting of 55 parts of butadiene-1,3, 25 parts of acrylonitrile and 20 parts of methyl acrylate is emulsified with about 250 parts of a 2% aqueous solution of myristic acid which has been 85% neutralized with sodium hydroxide to form an aqueous emulsion. 0.35 part of hydrogen peroxide, as a polymerization initiator, 1.0 part of sodium ferri pyrophosphate, as a polymerization accelerator, and 0.6 part of diisopropyl dixanthogen, as a polymerization modifier, are then added to the emulsion and the emulsion is agitated at a temperature of 30° C. After 22 hours the polymerization is complete and a latex-like dispersion is formed. A small amount of phenyl beta naphthylamine is added to the dispersion and the dispersion is then coagulated with a salt solution. A rubber-like multipolymer resembling crude natural rubber is thus obtained. The multipolymer is plastic, may be milled and otherwise processed without difficulty and is easily and completely soluble in benzene and acetone. It may be compounded with pigments, softeners, vulcanizing ingredients, etc., in substantially the same manner as natural rubber.

When this multipolymer is compounded in a standard tire tread recipe and then vulcanized an excellent vulcanizate is obtained. It possesses a tensile strength of over 4000 lbs./sq. in. and an ultimate elongation of about 750%. When exposed to low temperatures it remains soft and flexible at temperatures as low as —35° C. Moreover, it possesses excellent oil resistance, undergoing only a 14% volume increase when immersed in mineral oil for two weeks at 80° C.

A two component copolymer of 55 parts butadiene-1,3 and 45 parts acrylonitrile prepared in identically the same manner does not possess these valuable properties. It, for example, is much less plastic, more difficult to mill and is only about 65% soluble in benzene or acetone. Moreover, its vulcanizate becomes brittle at a temperature of only — 17.5° C.

*Example 14*

The following monomer mixture

| | Per cent by weight |
|---|---|
| Butadiene-1,3 | 55 |
| Acrylonitrile | 40 |
| Ethyl acrylate | 5 | is polymerized as in Example 13, to form a synthetic rubber which is plastic and soluble and yields a vulcanizate having a very low freezing point. A comparison with the 55/45 butadiene acrylonitrile copolymer follows:

| | Solubility in acetone | Freezing point |
|---|---|---|
| | Per cent | °C. |
| 55/45 butadiene-1,3 acrylonitrile copolymer | 68 | —17.5 |
| 55/40/5 butadiene-1,3 acrylonitrile ethyl acrylate multipolymer | 100 | —25 |

The oil resistance tensile properties of the two materials are both excellent and are substantially the same.

*Example 15*

A multipolymer is prepared as in Example 13, from a monomer mixture containing 55% by weight of butadiene-1,3, 15% by weight of acrylonitrile and 30% by weight of butyl acrylate. In 40 hours an 88% yield of a plastic soluble synthetic rubber which has an extremely low freezing point, namely —55° C., is obtained. The tensile properties and oil-resistance of its vulcanizate are also excellent.

*Example 16*

A mixture containing:

| | Parts |
|---|---|
| Butadiene-1,3 | 55 |
| Acrylonitrile | 25 |
| Methyl methacrylate | 20 | are polymerized as in Example 13. A plastic soluble synthetic rubber which yields vulcanizates having a low freezing point and even higher tensile strength and ultimate elongation than the product of Example 13 is obtained.

*Example 17*

A multipolymer is prepared by the polymerization in aqueous emulsion of a mixture containing 75% by weight of butadiene-1,3, 15% by weight of acrylonitrile and 10% by weight of butyl methacrylate. This multipolymer is plastic and soluble. It possesses a low freezing point and it may be vulcanized to form vulcanizates having an especially high elongation.

*Example 18*

Example 13 is repeated except that benzyl acrylate is employed in place of methyl acrylate. A good yield of a synthetic rubber having properties substantially equivalent to the rubber described in Example 13 is obtained.

*Example 19*

Example 16 is repeated except that methallyl methacrylate is employed in place of methyl methacrylate. A good yield of synthetic rubber which is also flexible at low temperatures is obtained.

*Example 20*

Example 16 is again repeated except that ethyl methacrylate is employed in place of methyl methacrylate. An excellent yield of a plastic soluble synthetic rubbery multipolymer is obtained. This multipolymer is also flexible at low temperatures, oil resistant and yields vulcanizates having high elongations. Similar results are obtained when methyl ethacrylate, butyl ethacrylate, hexyl ethacrylate and similar esters are substituted for methyl methacrylate.

*Example 21*

A mixture of 60 parts of butadiene-1,3, 30 parts of methyl acrylate and 10 parts of acrylamide are polymerized in the presence of 200 parts of a 1.5% solution of an alkyl benzene sulfonate as an emulsifying agent, 0.35 part of hydrogen peroxide as an initiator, 0.40 part of diisopropyl dixanthogen as a modifier and 0.2 part of a catalyst comprising complex pyrophosphates of iron and cobalt. A good yield of a rubbery multipolymer which may be worked on roll mills and vulcanized to strong resistant vulcanizates is obtained.

The above specific examples have been cited only for purposes of illustration and it is not intended that the invention be limited solely thereby for it is to be understood that wide variations in the nature and proportions of the materials polymerized and in the polymerization conditions employed may be effected without departing from the spirit and scope of the invention as defined by the appended claims.

I claim:

1. The method which comprises polymerizing in aqueous emulsion a mixture of polymerizable materials containing from 50 to 80% by weight of butadiene-1,3, from 10 to 40% by weight of acrylonitrile and from 10 to 40% by weight of an acrylic acid containing from 3 to 5 carbon atoms and having a terminal methylene group attached by a double bond to a carbon atom in turn attached to the carboxyl group.

2. The method which comprises polymerizing in aqueous emulsion a mixture containing from 50 to 80% by weight of butadiene-1,3, from 10 to 40% by weight of acrylonitrile and from 10 to 40% by weight of acrylic acid.

3. The method which comprises polymerizing in aqueous emulsion a mixture containing from 50 to 80% by weight of butadiene-1,3, from 10 to 40% by weight of acrylonitrile and from 10 to 40% by weight of ethacrylic acid.

4. A rubber-like multipolymer prepared by the method of claim 1.

5. A rubber-like multipolymer prepared by the method of claim 2.

6. A rubber-like multipolymer prepared by the method of claim 3.

WALDO L. SEMON.

Certificate of Correction

Patent No. 2,395,017. February 19, 1946.

WALDO L. SEMON

It is hereby certified that error appears in the printed specification of the above numbered patent requiring correction as follows: Page 3, second column, line 61, for "470 to" read *4700 to*; and that the said Letters Patent should be read with this correction therein that the same may conform to the record of the case in the Patent Office.

Signed and sealed this 5th day of November, A. D. 1946.

[SEAL]

LESLIE FRAZER,
*First Assistant Commissioner of Patents.* an emulsifying agent, 0.35 part of hydrogen peroxide as an initiator, 0.40 part of diisopropyl dixanthogen as a modifier and 0.2 part of a catalyst comprising complex pyrophosphates of iron and cobalt. A good yield of a rubbery multipolymer which may be worked on roll mills and vulcanized to strong resistant vulcanizates is obtained.

The above specific examples have been cited only for purposes of illustration and it is not intended that the invention be limited solely thereby for it is to be understood that wide variations in the nature and proportions of the materials polymerized and in the polymerization conditions employed may be effected without departing from the spirit and scope of the invention as defined by the appended claims.

I claim:

1. The method which comprises polymerizing in aqueous emulsion a mixture of polymerizable materials containing from 50 to 80% by weight of butadiene-1,3, from 10 to 40% by weight of acrylonitrile and from 10 to 40% by weight of an acrylic acid containing from 3 to 5 carbon atoms and having a terminal methylene group attached by a double bond to a carbon atom in turn attached to the carboxyl group.

2. The method which comprises polymerizing in aqueous emulsion a mixture containing from 50 to 80% by weight of butadiene-1,3, from 10 to 40% by weight of acrylonitrile and from 10 to 40% by weight of acrylic acid.

3. The method which comprises polymerizing in aqueous emulsion a mixture containing from 50 to 80% by weight of butadiene-1,3, from 10 to 40% by weight of acrylonitrile and from 10 to 40% by weight of ethacrylic acid.

4. A rubber-like multipolymer prepared by the method of claim 1.

5. A rubber-like multipolymer prepared by the method of claim 2.

6. A rubber-like multipolymer prepared by the method of claim 3.

WALDO L. SEMON.

Certificate of Correction

Patent No. 2,395,017.　　　　　　　　　　　　　　　　February 19, 1946.

WALDO L. SEMON

It is hereby certified that error appears in the printed specification of the above numbered patent requiring correction as follows: Page 3, second column, line 61, for "470 to" read *4700 to*; and that the said Letters Patent should be read with this correction therein that the same may conform to the record of the case in the Patent Office.

Signed and sealed this 5th day of November, A. D. 1946.

[SEAL]

LESLIE FRAZER,
*First Assistant Commissioner of Patents.*